(12) United States Patent
Lee et al.

(10) Patent No.: US 12,124,075 B2
(45) Date of Patent: Oct. 22, 2024

(54) DISPLAY DEVICE

(71) Applicant: E Ink Holdings Inc., Hsinchu (TW)

(72) Inventors: Kun-Hsien Lee, Hsinchu (TW); Ching-Huan Liao, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/506,132

(22) Filed: Nov. 10, 2023

(65) Prior Publication Data

US 2024/0184036 A1 Jun. 6, 2024

(30) Foreign Application Priority Data

Dec. 6, 2022 (TW) ................................. 111146720

(51) Int. Cl.
*F21V 8/00* (2006.01)
(52) U.S. Cl.
CPC ......... *G02B 6/0073* (2013.01); *G02B 6/0063* (2013.01)
(58) Field of Classification Search
CPC ............................ G02B 6/0073; G02B 6/0063
See application file for complete search history.

(56) References Cited

U.S. PATENT DOCUMENTS

| | | | | |
|---|---|---|---|---|
| 7,102,705 B2 * | 9/2006 | Kim | ..................... | G02B 6/0018 362/23.19 |
| 7,488,104 B2 | 2/2009 | Hamada et al. | | |
| 9,435,927 B2 * | 9/2016 | Song | .................... | G02B 6/0028 |
| 9,465,155 B2 * | 10/2016 | Kunimochi | .......... | G02B 6/0031 |
| 9,958,590 B2 | 5/2018 | Teragawa | | |
| 10,126,480 B2 | 11/2018 | Brown et al. | | |
| 2010/0048085 A1 * | 2/2010 | Kayanuma | ........... | G02B 6/0018 445/23 |
| 2011/0286237 A1 * | 11/2011 | Tanoue | ................ | G02B 6/0016 362/606 |
| 2017/0261677 A1 * | 9/2017 | Tai | ........................ | G02B 6/0036 |
| 2021/0333468 A1 | 10/2021 | Li et al. | | |
| 2022/0163717 A1 * | 5/2022 | Wen | ..................... | G02B 6/0091 |

FOREIGN PATENT DOCUMENTS

| | | |
|---|---|---|
| CN | 102245962 | 11/2011 |
| CN | 112965159 | 6/2021 |
| TW | 201708860 | 3/2017 |

(Continued)

OTHER PUBLICATIONS

"Office Action of Taiwan Counterpart Application", issued on Sep. 4, 2023, p. 1-p. 5.

(Continued)

*Primary Examiner* — Mary Ellen Bowman
(74) *Attorney, Agent, or Firm* — JCIPRNET (57) ABSTRACT

A display device including a display panel and a light source module is provided. The light source module includes a flexible light guide and a light emitting element. The flexible light guide has a light exiting portion and a light incident portion. The flexible light guide is bent so that the display panel is located between the light exiting portion and the light incident portion. The light incident portion has a light incident surface at a terminal. A thickness of the light incident portion is gradually increased toward the light incident surface. The light emitting element is disposed to face toward the light incident surface.

15 Claims, 5 Drawing Sheets

(56) References Cited

FOREIGN PATENT DOCUMENTS

| | | |
|---|---|---|
| TW | 201931409 | 8/2019 |
| TW | 202221393 | 6/2022 |

OTHER PUBLICATIONS

Fay Salmon et al., "Modeling the Mechanical Performance of a Foldable Display Panel Bonded by 3M Optically Clear Adhesives", SID 2017 Digest, Jun. 2017, pp. 938-941.

Masumi Nishimura et al., "Quantitative Evaluation of Neutral-plane Splitting in Foldable Displays Using Folding Stiffness Measurements and Finite Element Method Simulations", SID 2020 Digest, Sep. 2020, pp. 834-837.

Hsin-Tao Huang et al., "Front Light for Electrophoretic Display Applications", SID 2015 Digest, Jul. 2015, pp. 462-465.

Joo-Hyung Lee et al., "Mass-Producible Polydimethylsiloxane (PDMS) Frontlight Unit (FLU) for Reflective Displays", Journal of Display Technology, Sep. 2011, pp. 526-531.

Jyh-Cheng Yu et al., "Optical design optimization of high contrast light guide plate for front light unit", Microsystem Technologies, Jan. 2019, pp. 1-10.

C. K. Chung et al., "Fabrication of flexible light guide plate using CO2 laser LIGA-like technology", Microsyst Technol, Mar. 2013, pp. 439-443.

\* cited by examiner

DISPLAY DEVICE

CROSS-REFERENCE TO RELATED APPLICATION

This application claims the priority benefit of Taiwan application serial no. 111146720 filed on Dec. 6, 2022. The entirety of the above-mentioned patent application is hereby incorporated by reference herein and made a part of this specification.

BACKGROUND

Technical Field

The disclosure relates to an electronic device, and in particular relates to a display device.

Description of Related Art

Display devices are been used more and more widely, and various forms of designs have been developed according to the application environment. For example, existing display devices are designed to be flexible so that they may be applied in non-planar environments or allow users to bend during use. In order to achieve flexibility, each element in the display device is thinned as much as possible. For example, the thickness of a conventional light guide is thinned from 400 µm to 100 µm or even less than 50 µm, so that the light guide may be bent. However, since the light source is limited by the conventional packaging design and yield considerations, the thickness of the light source cannot match the thickness of the front light plate and be thinned from 400 µm to 50 µm. Therefore, most of the energy of the light source cannot be smoothly coupled into the light guide and only 10% of the light energy may be used. There is still room for improvement in the display device to achieve flexibility while maintaining ideal performance as much as possible.

SUMMARY

The disclosure provides a display device that uses a thinned flexible light guide while still maintaining an ideal light source utilization rate.

The display device of the disclosure includes a display panel and a light source module. The light source module includes a flexible light guide and a light emitting element. The flexible light guide has a light exiting portion and a light incident portion. The flexible light guide is bent so that the display panel is located between the light exiting portion and the light incident portion. The light incident portion has a light incident surface at a terminal. A thickness of the light incident portion is gradually increased toward the light incident surface. The light emitting element is disposed to face toward the light incident surface.

In an embodiment of the disclosure, the thickness of the light incident portion is 85% to 100% of a thickness of the light emitting element at the light incident surface.

In an embodiment of the disclosure, the light incident portion has a first inclined surface connected to a boundary of the light incident surface, and the first inclined surface is inclined at an angle relative to a normal direction of the light incident surface. The angle is greater than 0 degrees and less than 7 degrees.

In an embodiment of the disclosure, the first inclined surface is located between the light incident portion and the display panel.

In an embodiment of the disclosure, the light incident portion has a first inclined surface and a second inclined surface connected to a boundary of the light incident surface. The first inclined surface is opposite to the second inclined surface, and the first inclined surface and the second inclined surface are respectively inclined at an angle relative to a normal direction of the light incident surface. The angle is greater than 0 degrees and less than 7 degrees.

In an embodiment of the disclosure, the flexible light guide further has a bending portion connected between the light exiting portion and the light incident portion.

In an embodiment of the disclosure, the flexible light guide includes a first material layer and a second material layer. The second material layer is disposed on the first material layer, and the light incident portion is formed by a stack of the first material layer and the second material layer. The refractive index difference between the first material layer and the second material layer is, for example, less than 0.1. A thickness of the second material layer is gradually increased toward the light incident surface. The second material layer also extends in the light exiting portion, and a thickness of the second material layer in the light incident portion is greater than a thickness in the light exiting portion. The light incident portion has a first inclined surface connected to a boundary of the light incident surface, and the first inclined surface is located on the first material layer or the second material layer.

In an embodiment of the disclosure, the light exiting portion has light guide microstructures on a side away from the display panel.

Based on the above, the display panel of the embodiment of the disclosure uses a thinned flexible light guide in the light source device, and the flexible light guide has a light incident portion with a thickness that gradually increases toward the light incident surface. In this way, the display device may effectively use the light emitted by the light emitting element for display, and still have ideal light source utilization efficiency in a thinner design.

DETAILED DESCRIPTION OF DISCLOSED EMBODIMENTS

Figure 1:
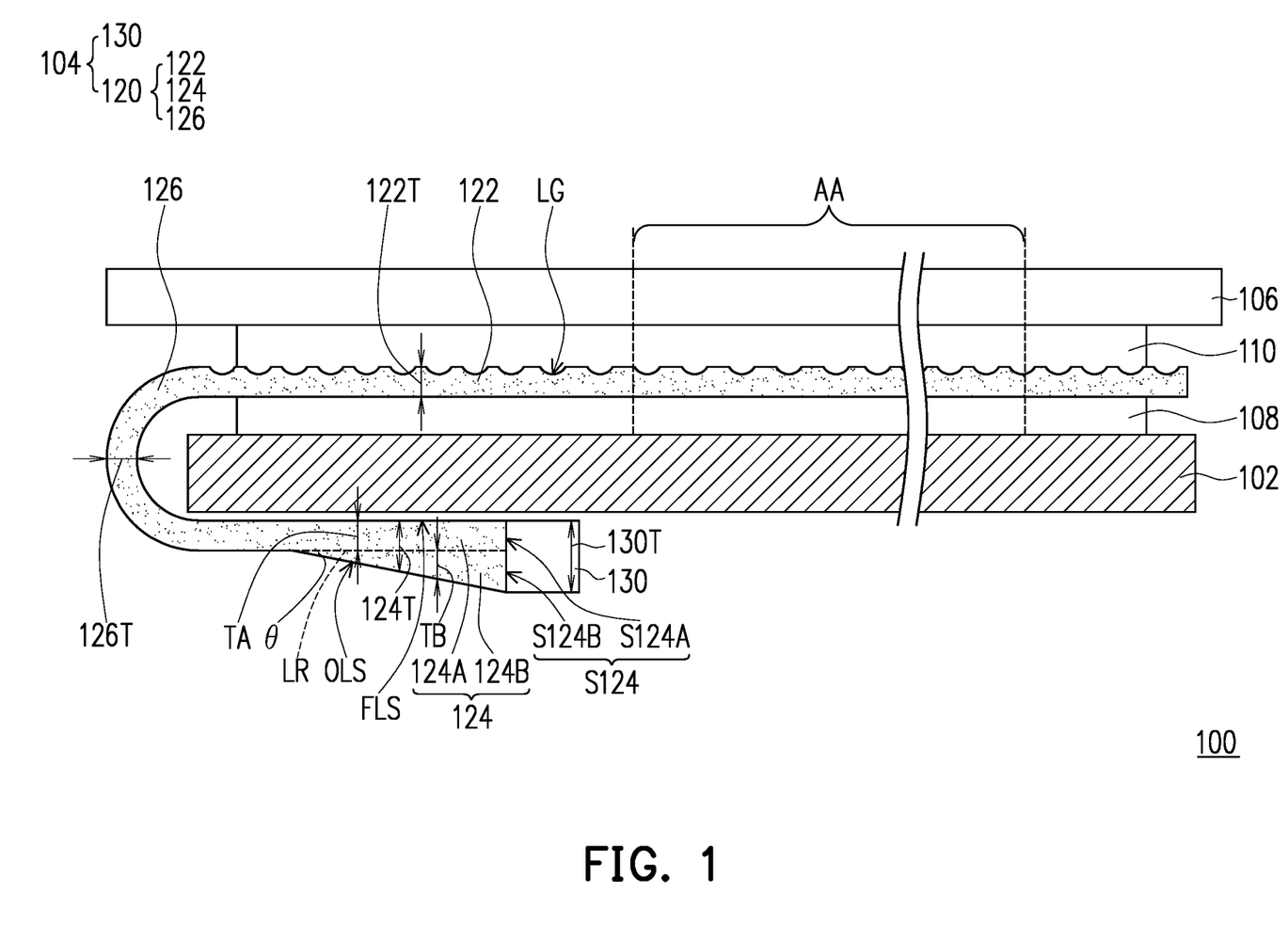
FIG. 1 is a side schematic view of a display device according to an embodiment of the disclosure.

FIG. 1 is a side schematic view of a display device according to an embodiment of the disclosure. In FIG. 1, a display device 100 at least includes a display panel 102 and a light source module 104. In some embodiments, the display device 100 may further include a cover plate 106 and optical adhesives 108 and 110. The light source module 104 may be attached to the display panel 102 through the optical adhesive 108, and the cover plate 106 may be attached to the optical module 104 through the optical adhesive 110. The optical adhesive 108 and the optical adhesive 110 may be light transmissive adhesive materials, and may be similar to double-sided adhesive tape to attach elements on both sides together. In some embodiments, the display panel 102 may be a reflective display panel, and the light source module 104 is a front light source disposed in front of the display panel 102. The light provided by the light source module 104 may be irradiated toward the display region AA of the display panel 102 and reflected by the display panel 102 to emit display light toward the cover plate 106 for users to see. For example, the display panel 102 includes an electronic paper display panel, which uses electrophoretic display technology, electrowetting display technology, or similar display technology to realize display functions. In addition, the cover plate 106 may be selectively disposed on the light source module 104 to provide a protective function and prevent the light source module 104 and the display panel 102 from being damaged. In some embodiments, the cover plate 106 may be a plate-shaped element or a film with good light transmission.

The light source module 104 includes a flexible light guide 120 and a light emitting element 130. The flexible light guide 120 has, for example, a light exiting portion 122 and a light incident portion 124. Specifically, the flexible light guide 120 is flexible and further has a bending portion 126. The bending portion 126 is connected between the light exiting portion 122 and the light incident portion 124, and the bending portion 126 is bent so that the display panel 102 is located between the light exiting portion 122 and the light incident portion 124. The light incident portion 124 has a light incident surface S124 at a terminal, and the light emitting element 130 is disposed to face toward the light incident surface S124. That is to say, the light emitting element 130 is disposed beside the flexible light guide 120, and the light emitting surface of the light emitting element 130 faces the light incident surface S124. The light emitting element 130 is, for example, a light emitting diode, but not limited thereto.

In this embodiment, the light exiting portion 122 of the flexible light guide 120 may be attached to the display panel 102 through the optical adhesive 108, and the area of the light exiting portion 122 may cover the entire display region AA of the display panel 102. The flexible light guide 120 may guide the light emitted by the light emitting element 130 to the light exiting portion 122, and then irradiate the entire display region AA of the display panel 102 from the light exiting portion 122, so as to provide the light source required for the display screen. In some embodiments, the light exiting portion 122 has a light guide microstructure LG on a side away from the display panel 102. The light guide microstructure LG may be a bumpy structure, which helps guide the light to distribute more uniformly in the flexible light guide 120. In some embodiments, the distribution area of the light guide microstructure LG may be larger than the display region AA of the display panel 102, but not limited thereto. In addition, the light incident portion 124 may be disposed outside the display region AA without overlapping the display region AA. In some embodiments, the distribution density of the light guide microstructure LG may be adjusted as required. For example, the distribution density of the light guide microstructures LG may be relatively sparse at the center of the flexible light guide 120 and relatively dense near the edge, but it is not limited thereto.

In this embodiment, the thickness 122T of the light exiting portion 122 may be less than the thickness 124T of the light incident portion 124. In some embodiments, the thickness 122T of the light exiting portion 122 may be from 50 microns to 100 microns. The thinned light exiting portion 122 and the display panel 102 are flexible, allowing the user to bend the display device 100 during use to realize flexibility during use, and also allow the display device 100 to be applied in a non-planar environment, to realize the application of an arc display. In addition, the thickness 126T of the bending portion 126 may be substantially the same as the thickness 122T of the light exiting portion 122. Therefore, the bending portion 126 may be bent such that the light exiting portion 122 and the light incident portion 124 are located on opposite sides of the display panel 102.

When the light emitting element 130 is a light emitting diode, the thickness 130T may be hundreds of microns, for example, 300 to 400 microns. In this embodiment, the light exiting portion 122 has a thinned structure, so that the thickness 122T of the light exiting portion 122 is significantly less than the thickness 130T of the light emitting element 130. If the entirety of the flexible light guide 120 is designed to have a thinner thickness, a certain proportion of the light emitted by the light emitting element 130 cannot enter the flexible light guide 120, resulting in poor light source utilization efficiency. Therefore, the light incident portion 124 of this embodiment is a portion of the flexible light guide 120 close to the light incident surface S124, and the thickness 124T of the light incident portion 124 is gradually increased toward the light incident surface S124. For example, the thickness 124T of the light incident portion 124 may have a maximum thickness at the light incident surface S124, and this maximum thickness may be 85% to 100% of the thickness 130T of the light emitting element 130, and the maximum thickness may be even slightly greater than the thickness 130T. In this way, the size of the light incident surface S124 and the size of the light emitting element 130 may match each other, allowing the light emitted by the light emitting element 130 to enter the flexible light guide 120 more efficiently, so as to achieve ideal light source utilization efficiency.

In this embodiment, the light incident portion 124 has, for example, a wedge-shaped structure. For convenience of illustration, a virtual line LR is marked in FIG. 1. The virtual limit LR is substantially parallel to the normal direction of the light incident surface S124, and may divide the light incident portion 124 into a first region 124A and a second region 124B. The first region 124A may be regarded as the region extending outward from the light exiting portion 122 in the flexible light guide 120, and the light incident portion 124 has a substantially constant thickness TA in the first region 124A, in which the thickness TA may be substantially the same as the thickness 122T of the light exiting portion 122. The light incident portion 124 has a thickness TB gradually increasing toward the light incident surface S124 in the second region 124B. It may be seen from FIG. 1 that the first region 124A is located between the second region 124B and the display panel 102. In this way, the outline of the light incident portion 124 in the first region 124A may have a first inclined surface OLS connected to the boundary of the light incident surface S124, and the light incident portion 124 may have a plane FLS connected to the boundary of the light incident surface S124 in the second region 124B. The plane FLS is closer to the display panel 102 than the first inclined surface OLS, that is to say, the light incident portion 124 is located between the first inclined surface OLS and the display panel 102. The plane FLS may be substantially parallel to the normal direction of the light incident surface S124. The first inclined surface OLS is inclined by an angle θ relative to the normal direction of the light incident surface S124 (e.g., the direction parallel to the virtual line LR). According to simulation experiments, if the angle θ is greater than 7 degrees, the light may not be efficiently guided to the light exiting portion 122 after entering the flexible light guide 120 from the light incident surface S124. Thus, in some embodiments, the angle θ is, for example, greater than 0 degrees and less than 7 degrees.

In some embodiments, the material of the flexible light guide 120 may include polycarbonate (PC), acrylic (PMMA), or similar materials. The flexible light guide 120 may be integrally made of the same material, may be made of the same material in portions, or may be made of different materials in portions. For example, the first region 124A of the light incident portion 124 may be integrally made of the same first material layer as the bending portion 126 and the light exiting portion 122, and the second region 124B of the light incident portion 124 may be made of a second material layer and overlap with the first region 124A. That is to say, the first material layer may continuously extend in the flexible light guide 120, and the second material layer may be stacked with the first material layer to form the light incident portion 124. The first material layer and the second material layer may be different materials or the same material, but both have similar optical properties. For example, the refractive index difference between the first material layer and the second material layer is, for example, less than 0.1. In other words, there may be a physical interface between the first region 124A and the second region 124B of the light incident portion 124 (e.g., the location of the virtual line LR is the interface), in which the second region 124B may be a region having a triangular cross-sectional shape, but not limited thereto.

Figure 2:
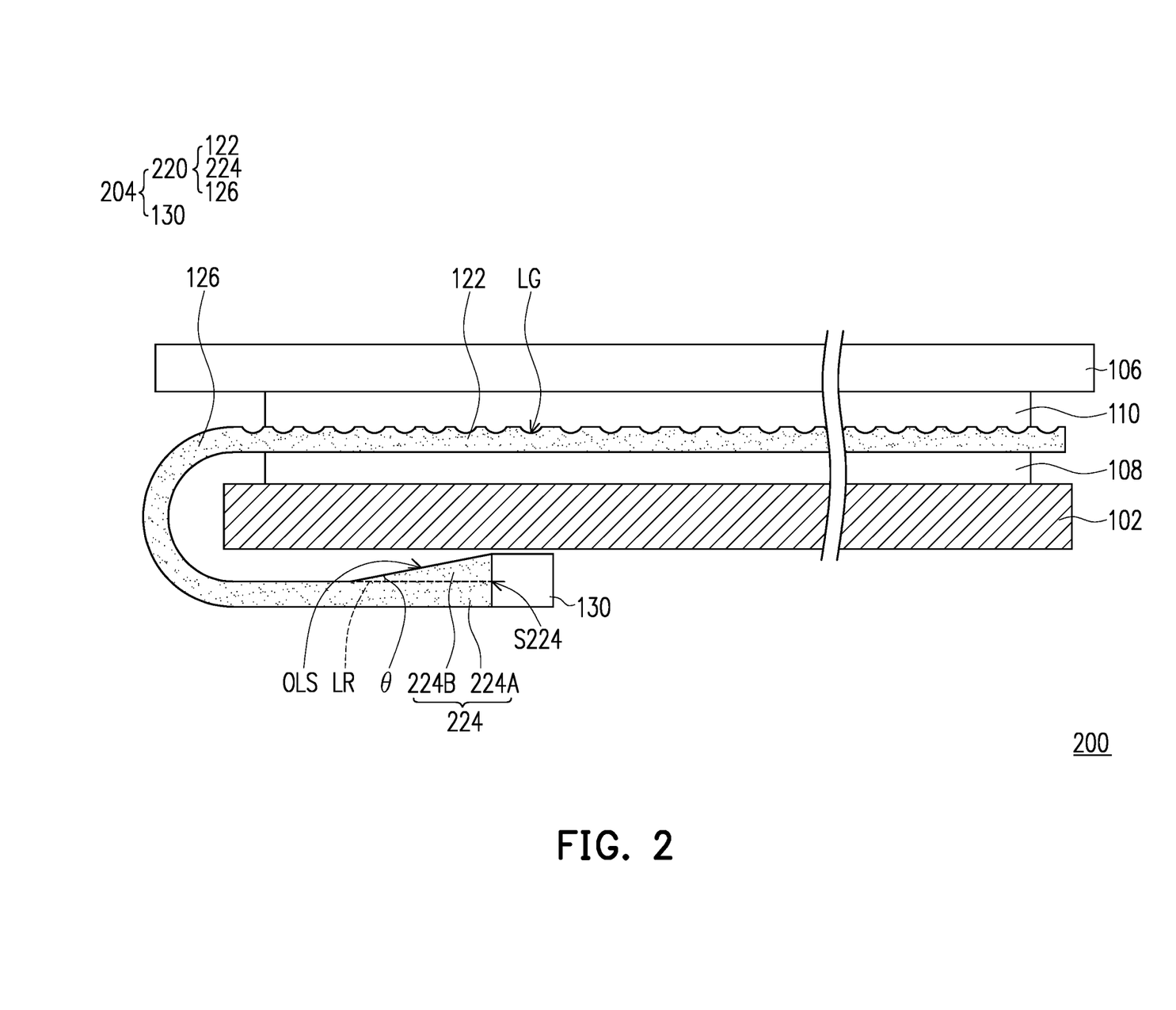
FIG. 2 is a side schematic view of a display device according to an embodiment of the disclosure.

FIG. 2 is a side schematic view of a display device according to an embodiment of the disclosure. The display device 200 in FIG. 2 is substantially similar to the display device 100 in FIG. 1, therefore, the same reference numerals are used in the two embodiments to denote the same elements, and the descriptions of these elements in the two embodiments may refer to and apply to each other. The display device 200 includes a display panel 102, a light source module 204, a cover plate 106, an optical adhesive 108 and an optical adhesive 110, in which the structural design of the light source module 204 is slightly different from the embodiment shown in FIG. 1. The light source module 204 of this embodiment includes a flexible light guide 220 and a light emitting element 130, and the flexible light guide 220 has a light exiting portion 122, a light incident portion 224, and a bending portion 126. The relevant descriptions of the light emitting element 130, the light exiting portion 122, and the bending portion 126 may refer to the embodiment of FIG. 1, and are not repeated herein.

In this embodiment, the light incident portion 224 has, for example, a wedge-shaped structure with a light incident surface S224 at the terminal, and the light incident portion 224 is divided into a first region 224A and a second region 224B by the virtual display LR. The virtual line LR is roughly parallel to the normal direction of the light incident surface S224. The first region 224A may be regarded as a region extending outward from the light exiting portion 122/bending portion 126 in the flexible light guide 220, and the light incident portion 224 in the first region 224A has substantially the same thickness as the light exiting portion 122. The light incident portion 224 gradually thickens toward the light incident surface S224 in the second region 224B. In this embodiment, the second region 224B is located between the first region 224A and the display panel 102. In other words, the light incident portion 224 may have a first inclined surface OLS, and the first inclined surface OLS is located between the light incident portion 224 (the physical portion of the flexible light guide 220) and the display panel 102. Similar to the embodiment in FIG. 1, the first inclined surface OLS is inclined by an angle θ relative to the normal direction of the light incident surface S224 (e.g., the direction parallel to the virtual line LR).

The material of the flexible light guide 220 may include polycarbonate (PC), acrylic (PMMA), or similar materials. The flexible light guide 220 may be integrally made of the same material, may be made of the same material in portions, or may be made of different materials in portions. For example, the first region 224A of the light incident portion 224 may be integrally made of the same first material layer as the bending portion 126 and the light exiting portion 122, and the second region 224B of the light incident portion 224 may be made of a second material layer and overlap with the first region 224A. That is to say, the first material layer may continuously extend in the flexible light guide 220, and the second material layer may be stacked with the first material layer to form the light incident portion 224. Overall, the difference between the flexible light guide 220 and the flexible light guide 120 is mainly the disposition location of the first inclined surface OLS of the light incident portion 224. In this way, when the flexible light guide 220 is pulled into a flat state, the first inclined surface OLS of the light incident portion 224 and the light guide microstructure LG of the light exiting portion 122 are located on opposite sides of the flexible light guide 220. In contrast, in the embodiment of FIG. 1, when the flexible light guide 120 is pulled into a flat state, the first inclined surface OLS and the light guide microstructure LG on the light exiting portion 122 are located on the same side of the flexible light guide 120.

Figure 3:
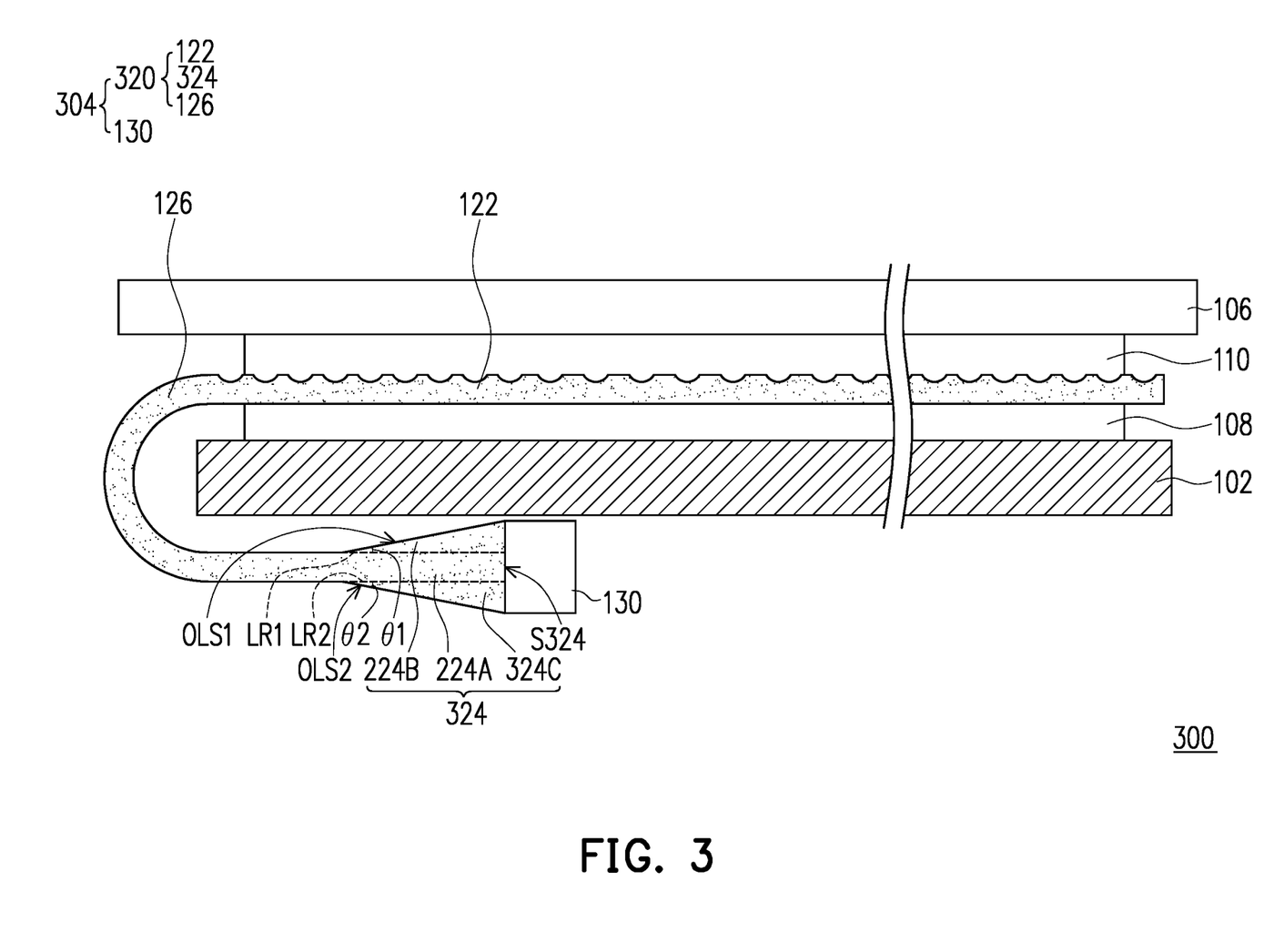
FIG. 3 is a side schematic view of a display device according to an embodiment of the disclosure.

FIG. 3 is a side schematic view of a display device according to an embodiment of the disclosure. The display device 300 in FIG. 3 is substantially similar to the display device 200 in FIG. 2, therefore, the same reference numerals are used in the two embodiments to denote the same elements, and the descriptions of these elements in the two embodiments may refer to and apply to each other. The display device 300 in FIG. 3 includes a display panel 102, a light source module 304, a cover plate 106, an optical adhesive 108, and an optical adhesive 110, and the light source module 304 includes a flexible light guide 320 and a light emitting element 130. Specifically, the difference between this embodiment and the display device 200 in FIG. 2 is mainly the structural design of the flexible light guide 320. Therefore, the description of the remaining elements of the display device 300 may refer to the related descriptions of FIG. 1 and FIG. 2.

In this embodiment, the flexible light guide 320 has a light exiting portion 122, a light incident portion 324 and a bending portion 126, in which the description of the light exiting portion 122 and the bending portion 126 may refer to the foregoing embodiments. The light incident portion 324 may have a light incident surface S324 at a terminal. The light incident portion 324 has a funnel-like outline in a side view and is divided into a first region 224A, a second region 224B, and a third region 324C by the virtual line LR1 and the virtual line LR2. The second region 224B and the third region 324C are located on opposite sides of the first region 224A. When the flexible light guide 320 is flattened, the virtual line LR1 and the virtual line LR2 may be lines extending outward along the outline of the bending portion 126 and substantially parallel to the normal line of the light incident surface S324. Similar to the description of the foregoing embodiments, the first region 224A may be regarded as a region extending outward from the light exiting portion 122/bending portion 126 in the flexible light guide 220, and has a substantially uniform thickness structure. The light incident portion 324 has a thickness gradually increasing toward the light incident surface S324 in the second region 224B and the third region 324C. In this way, the light incident portion 324 has a first inclined surface OLS1 and a second inclined surface OLS2 connected to a boundary of the light incident surface S324. The first inclined surface OLS1 is opposite to the second inclined surface OLS2, and the first inclined surface OLS1 and the second inclined surface OLS2 are respectively inclined at an angle θ1 and an angle θ2 relative to the normal direction of the light incident surface S324. In some embodiments, the angle θ1 and the angle θ2 may respectively be greater than 0 degrees and less than 7 degrees.

The flexible light guide 320 may be integrally made of the same material, may be made of the same material in portions, or may be made of different materials in portions. For example, the first region 224A of the light incident portion 324 may be integrally made of the same first material as the bending portion 126 and the light exiting portion 122, and the second region 224B and the third region 324C of the light incident portion 324 may be made of a second material and overlap with the first region 224A. In some embodiments, the material of the flexible light guide 320 may include polycarbonate (PC), acrylic (PMMA), or similar materials. With the varying thicknesses of the second region 224B and the third region 324C, the light incident surface S324 may have a substantially corresponding thickness to the light emitting element 130 to facilitate improving the efficiency of light entering the flexible light guide 320.

Figure 4:
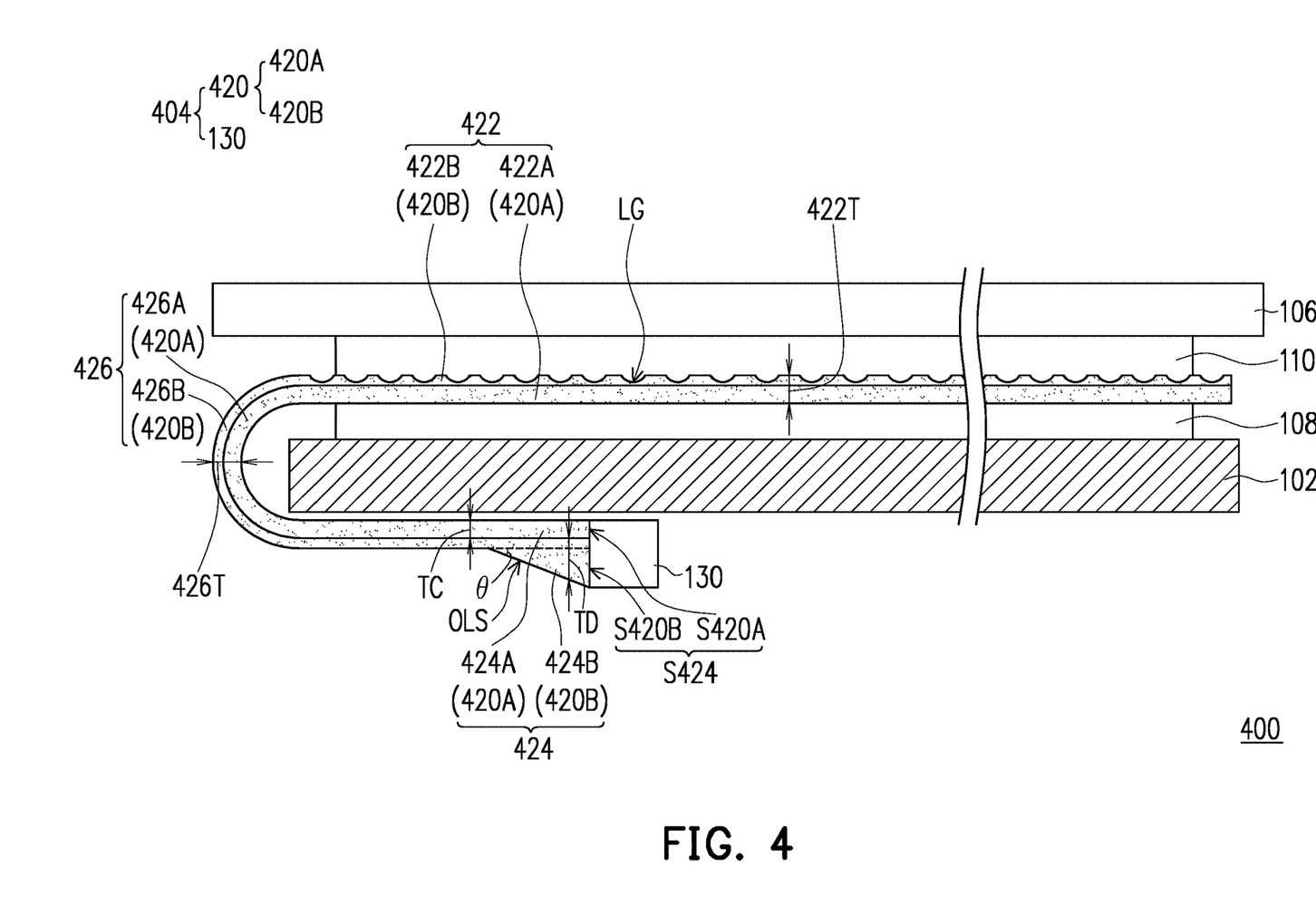
FIG. 4 is a side schematic view of a display device according to an embodiment of the disclosure.

FIG. 4 is a side schematic view of a display device according to an embodiment of the disclosure. The display device 400 in FIG. 4 is substantially similar to the display device 100 in FIG. 1, therefore, the same reference numerals are used in the two embodiments to denote the same elements, and the descriptions of these elements in the two embodiments may refer to and apply to each other. The display device 400 in FIG. 4 includes a display panel 102, a light source module 404, a cover plate 106, an optical adhesive 108, and an optical adhesive 110, and the light source module 404 includes a flexible light guide 420 and a light emitting element 130. Specifically, the difference between this embodiment and the display device 100 in FIG. 1 is mainly the structural design of the flexible light guide 420. Therefore, the description of the remaining elements of the display device 400 may refer to the related descriptions of FIG. 1 and FIG. 2.

The flexible light guide 420 includes a first material layer 420A and a second material layer 420B. The first material layer 420A extends continuously in the flexible light guide 420. The second material layer 420B is disposed on the first material layer 420A, and the second material layer 420B also extends continuously in the flexible light guide 420. Therefore, the flexible light guide 420 is entirely formed by a stack of the first material layer 420A and the second material layer 420B. The first material layer 420A and the second material layer 420B may be made of different materials, or made of the same material. When different materials are used, the refractive index difference between the first material layer 420A and the second material layer 420B may be less than 0.1. The first material layer 420A and the second material layer 420B may be manufactured by extrusion molding to form the flexible light guide 420, but not limited thereto.

Specifically, the flexible light guide 420 may be divided into a light exiting portion 422, a light incident portion 424, and a bending portion 426. The bending portion 426 may be bent such that the light exiting portion 422 and the light incident portion 424 are located on opposite sides of the display panel 102. The light exiting portion 422 is formed by a stack of the portion 422A of the first material layer 420A and the portion 422B of the second material layer 420B, in which the portion 422A of the first material layer 420A is thicker than the portion 422B of the second material layer 420B. The light incident portion 424 is formed by a stack of the portion 424A of the first material layer 420A and the portion 424B of the second material layer 420B. Meanwhile, the bent portion 426 is formed by a stack of the portion 426A of the first material layer 420A and the portion 426B of the second material layer 420B, and the portion 426A of the first material layer 420A is thicker than the portion 426B of the second material layer 420B. In some embodiments, the second material layer 420B may be formed on the first material layer 420A by coating, deposition, or similar methods. In some embodiments, the flexible light guide 420 may be manufactured by extrusion molding to have a desired structure and shape.

In this embodiment, the light exiting portion 422 may have multiple light guide microstructures LG, and the light guide microstructures LG are disposed on a side of the flexible light guide 420 away from the display panel 102. Meanwhile, the flexible light guide 420 is attached to the display panel 102 in a manner such that the first material layer 420A is located between the second material layer 420B and the display panel 102. Therefore, the light guiding microstructure LG may be located on the surface of the second material layer 420B, and the distribution area of the light guiding microstructure LG may at least cover the area of the display region AA of the display panel 102. The thickness 422T of the light exiting portion 422 may be from 50 microns to 100 microns. In some embodiments, the light exiting portion 422 and the display panel 102 are bendable to realize non-planar or foldable applications. In some embodiments, the bent portion 426 may extend continuously from the light exiting portion 422 without the light guide microstructure LG, so the bent portion 426 may have a substantially uniform thickness 426T. The thickness 426T may be from 50 microns to 100 microns.

The light incident portion 424 may be formed by a stack of the first material layer 420A and the second material layer 420B. In this embodiment, the portion 424A of the first material layer 420A and the portion 424B of the second material layer 420B form the light incident portion 424. The portion 424A of the first material layer 420A may have a constant thickness TC, and the portion 424A of the first material layer 420A may be the same thickness as the portion 422A of the first material layer 420A and the portion 426A of the first material layer 420A. That is to say, the first material layer 420A may be a material layer with uniform thickness. The thickness TD of the portion 424B of the second material layer 420B is a variable thickness. In addition, the thickness TD of the second material layer 420B at the light incident portion 424 is greater than the thickness (not marked) at the light exiting portion 422.

In this embodiment, the terminal surface S420A of the first material layer 420A is coplanar with the terminal surface S420B of the second material layer 420B to form the light incident surface S424 of the flexible light guide 420. The thickness TD of the second material layer 420B may gradually increase toward the light incident surface S424. Based on the thickness variation, the light incident portion 424 has a first inclined surface OLS, and the first inclined surface OLS is inclined at an angle θ relative to the normal direction of the light incident surface S424. Thus, the first inclined surface OLS is located at the second material layer 420B. In some embodiments, the angle θ is greater than 0 degrees and less than 7 degrees. The size of the light incident portion 424 with varying thickness on the light incident surface S424 may substantially correspond to the size of the light emitting element 130 to effectively receive the light emitted by the light emitting element 130, thereby achieving ideal light utilization efficiency. In addition, the inclination angle of the first inclined surface OLS is relatively moderate, which facilitates guiding the light to transmit inside the flexible light guide 420 and reduce unwanted light leakage at the first inclined surface OLS.

Figure 5:
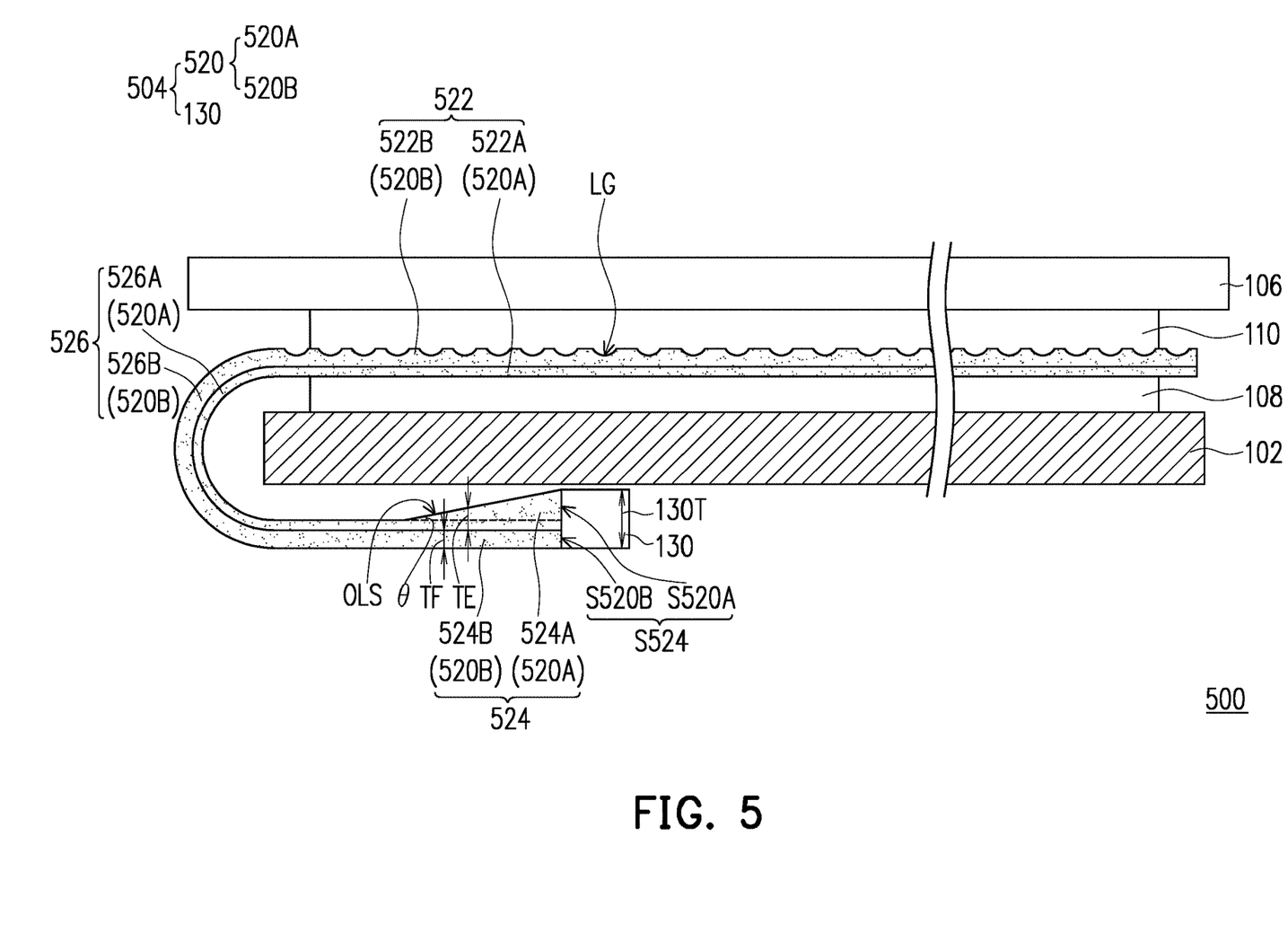
FIG. 5 is a side schematic view of a display device according to an embodiment of the disclosure.

FIG. 5 is a side schematic view of a display device according to an embodiment of the disclosure. The display device 500 in FIG. 5 is substantially similar to the display device 400 in FIG. 4, therefore, the same reference numerals are used in the two embodiments to denote the same elements, and the descriptions of these elements in the two embodiments may refer to and apply to each other. The display device 500 in FIG. 5 includes a display panel 102, a light source module 504, a cover plate 106, an optical adhesive 108, and an optical adhesive 110, and the light source module 504 includes a flexible light guide 520 and a light emitting element 130. Specifically, the difference between this embodiment and the display device 100 in FIG. 1 is mainly that the flexible light guide 520 includes a first material layer 520A and a second material layer 520B, and the first material layer 520A and the second material layer 520B are stacked to form the light exiting portion 522, the light incident portion 524, and the bending portion 526. The first material layer 520A and the second material layer 520B are continuously extended throughout the flexible light guide 520, and the first material layer 520A is located between the second material layer 520B and the display panel 102.

The flexible light guide 520 may be divided into a light exiting portion 522, a light incident portion 524, and a bending portion 526. The terminal surface S520A of the first material layer 520A is coplanar with the terminal surface S520B of the second material layer 520B to form a light incident surface S524, and the light emitting element 130 is disposed to emit light toward the light incident surface S524. The bending portion 526 may be bent such that the light exiting portion 522 and the light incident portion 524 are located on opposite sides of the display panel 102. The light exiting portion 522 is formed by a stack of the portion 522A of the first material layer 520A and the portion 522B of the second material layer 520B. The portion 522A of first material layer 520A is thinner than the portion 522B of second material layer 520B. The light incident portion 524 is formed by a stack of the portion 524A of the first material layer 520A and the portion 524B of the second material layer 520B, and the portion 524A of the first material layer 520A has a thickness TE gradually increasing toward the light incident surface S524. The bent portion 526 is formed by a stack of the portion 526A of the first material layer 520A and the portion 526B of the second material layer 520B, and the bent portion 526 may have a substantially constant thickness. In some embodiments, the second material layer 520B has substantially the same thickness at the light incident portion 524 and the bending portion 526, and the thickness TF of the portion 524B of the second material layer 520B is approximately constant.

In this embodiment, the portion 522B of the second material layer 520B has light guide microstructures LG, and the light guide microstructures LG are located on a side of the light exiting portion 522 away from the display panel 102. In addition, the portion 524A of the first material layer 520A has a varying thickness TE, so a first inclined surface OLS is formed on a side of the light incident portion 524 adjacent to the display panel 102. That is, the first inclined surface OLS is located at the first material layer 520A. The first inclined surface OLS is inclined by an angle θ relative to the normal direction of the light incident surface S524, and the angle θ may be greater than 0 degrees and less than 7 degrees. Specifically, the thickness of the portion 524A of the first material layer 520A varies, so that the light incident portion 524 gradually thickens toward the light incident surface S524. In some embodiments, the size of the light incident surface S524 may be substantially similar to the thickness 130T of the light emitting element 130 so as to fully receive the light emitted by the light emitting element 130, thereby achieving ideal light utilization efficiency.

To sum up, the display device according to the embodiment of the disclosure has a flexible light guide that is thinner at the light exiting portion and thicker at the light incident portion. The flexible light guide may match the size of the light emitting element to fully receive the light emitted by the light emitting element. Therefore, the light source module of the display device has ideal light utilization efficiency. In addition, the design of the thinned light exiting portion satisfies the requirement of being bendable, so the display device may be applied in a non-planar environment or in a foldable (flexible) product.

What is claimed is:

1. A display device, comprising:
a display panel; and
a light source module, comprising a flexible light guide and a light emitting element, the flexible light guide having a light exiting portion and a light incident portion, wherein the flexible light guide is bent so that the display panel is located between the light exiting portion and the light incident portion, the light incident portion has a light incident surface at a terminal, a thickness of the light incident portion is gradually increased toward the light incident surface, and the light emitting element is disposed to face toward the light incident surface,
wherein the flexible light guide further has a bending portion connected between the light exiting portion and the light incident portion,
wherein the flexible light guide comprises a first material layer and a second material layer, the second material layer is disposed on the first material layer, and the light incident portion is formed by a stack of the first material layer and the second material layer,
wherein the bent portion is formed by a portion of the first material layer and a portion of the second material layer.

2. The display device according to claim 1, wherein the thickness of the light incident portion is 85% to 100% of a thickness of the light emitting element at the light incident surface.

3. The display device according to claim 1, wherein the light incident portion has a first inclined surface connected to a boundary of the light incident surface, and the first inclined surface is inclined at an angle relative to a normal direction of the light incident surface.

4. The display device according to claim 3, wherein the angle is greater than 0 degrees and less than 7 degrees.

5. The display device according to claim 3, wherein the first inclined surface is located between the light incident portion and the display panel.

6. The display device according to claim 1, wherein the light incident portion has a first inclined surface and a second inclined surface connected to a boundary of the light incident surface, the first inclined surface is opposite to the second inclined surface, and the first inclined surface and the second inclined surface are respectively inclined at an angle relative to a normal direction of the light incident surface.

7. The display device according to claim 6, wherein the angle is greater than 0 degrees and less than 7 degrees.

8. The display device according to claim 1, wherein a refractive index difference between the first material layer and the second material layer is less than 0.1.

9. The display device according to claim 1, wherein a thickness of the second material layer is gradually increased toward the light incident surface.

10. The display device according to claim 1, wherein the second material layer also extends in the light exiting portion, and a thickness of the second material layer in the light incident portion is greater than a thickness in the light exiting portion.

11. The display device according to claim 1, wherein the light incident portion has a first inclined surface connected to a boundary of the light incident surface, and the first inclined surface is located on the first material layer or the second material layer.

12. The display device according to claim 1, wherein the light exiting portion has light guide microstructures on a side away from the display panel.

13. The display device according to claim 1, wherein the light incident portion is located outside a display area of the display panel without overlapping the display area.

14. The display device according to claim 1, wherein the thickness of the light incident portion is greater than or equal to 85% of a thickness of the light emitting element and smaller than the thickness of the light emitting element at the light incident surface.

15. The display device according to claim 1, wherein the thickness of the light incident portion is greater than a thickness of the light emitting element.

* * * * *